United States Patent
Hatano et al.

[11] Patent Number: 6,130,738
[45] Date of Patent: Oct. 10, 2000

[54] LIQUID CRYSTAL DEVICE HAVING A RESIN WALL USING DIFFERENT RESINS WITH DIFFERENT SURFACE INTERACTIONS STRUCTURE AND MANUFACTURING METHOD FOR SAME

[75] Inventors: Takuji Hatano, Suita; Masakazu Okada, Kyoto, both of Japan

[73] Assignee: Minolta Co., Ltd., Osaka, Japan

[21] Appl. No.: 09/071,114

[22] Filed: May 1, 1998

[30] Foreign Application Priority Data

May 9, 1997 [JP] Japan .................................. 9-119550

[51] Int. Cl.⁷ ........................ G02F 1/1333; G02F 1/1339
[52] U.S. Cl. ................................................ 349/156; 349/90
[58] Field of Search ............................ 349/89, 90, 129, 349/130, 150

[56] References Cited

U.S. PATENT DOCUMENTS

| | | | |
|---|---|---|---|
| 3,578,844 | 5/1971 | Kettering et al. | 350/160 |
| 5,186,985 | 2/1993 | Estes et al. | 428/1 |
| 5,188,870 | 2/1993 | Brosig | 428/1 |
| 5,270,843 | 12/1993 | Wang | 349/90 |
| 5,309,264 | 5/1994 | Lien et al. | 359/87 |
| 5,384,067 | 1/1995 | Doane et al. | 252/299.01 |
| 5,410,424 | 4/1995 | Konuma et al. | 349/90 |
| 5,437,811 | 8/1995 | Doane et al. | 252/299.01 |
| 5,473,450 | 12/1995 | Yamada et al. | 359/51 |
| 5,574,581 | 11/1996 | Shimizu et al. | 359/52 |
| 5,745,198 | 4/1998 | Havens et al. | 349/90 |

FOREIGN PATENT DOCUMENTS 6-507505  8/1994  Japan .
6-301015  10/1994 Japan .

*Primary Examiner*—Kenneth Parker
*Attorney, Agent, or Firm*—Sidley & Austin

[57] ABSTRACT

A liquid crystal device that includes a pair of substrates and a composite layer disposed between the substrates. The composite layer has a liquid crystal phase of a liquid crystal material and a resin phase of a resin. The liquid crystal device is made such that the resin phase comprises a resin wall structure which does not contain a substantial amount of the liquid crystal material. To enhance contrast and viewing angle, the resin phase has a rough surface which is sufficient to disarrange an orientation of molecules of the liquid crystal material. The invention is further directed to a method of manufacturing a liquid crystal device, which includes the steps of defining a mixing ratio of two kinds of resin raw materials that have different contact angles, mixing these kinds of resin raw materials, mixing the mixed raw material with a liquid crystal material, and separating the mixed material from the liquid crystal material. In a preferred embodiment the resulting resin phase would have a contact angle with respect to the liquid crystal material in the range of 11° to 15°.

30 Claims, 1 Drawing Sheet

LIQUID CRYSTAL DEVICE HAVING A RESIN WALL USING DIFFERENT RESINS WITH DIFFERENT SURFACE INTERACTIONS STRUCTURE AND MANUFACTURING METHOD FOR SAME

This application is based on application No. 9-119550 (119550/1997) Pat. filed in Japan, the contents of which are hereby incorporated by reference.

BACKGROUND OF THE INVENTION

1. Field of the Invention

The present invention relates to a liquid crystal device having a composite layer or film which contains a liquid crystal phase of a liquid crystal material and a resin phase of resin as well as a method of manufacturing the same and a method of controlling the form of the resin phase in the liquid crystal device.

2. Description of the Background Art

Various kinds of liquid crystal display devices having a memory effect have already been proposed.

U.S. Pat. No. 3,578,844 has disclosed that a memory effect is exhibited by a liquid crystal device, in which cholesteric liquid crystal material capsuled with a polymer such as gelatin or gum arabi is held between a pair of substrates. It has also been disclosed that such a liquid crystal device exhibits three different appearances when no voltage is applied, when a voltage is applied and when voltage application is stopped.

National Patent Publication of Translated Version No. 6-507505 (JP, A, 6-507505) has disclosed that a memory effect is exhibited by a liquid crystal device, in which a chiral nematic liquid crystal material containing resin added thereto at a rate of 10% by weight with respect to the whole weight and exhibiting a cholesteric characteristic is held between a pair of substrates. It has also disclosed that such a liquid crystal device exhibits different appearances according to orientations, i.e., a planar orientation in which helical axes of liquid crystal molecules are oriented vertically with respect to the substrate surface and a focal conic orientation in which the helical axes are oriented irregularly or substantially parallel to the substrate surface.

If the helical axes in the planar orientation are oriented excessively uniformly, a dependency on a viewing angle excessively increases and, for example, the liquid crystal device, which exhibits a transparent appearance when viewed vertically with respect to the substrate, exhibits an opaque appearance when viewed in an angle shifted from the vertical direction with respect to the substrate. According to the foregoing publication No. 6-507505, however, addition of a small amount of resin into the liquid crystal material causes a mutual action between the liquid crystal material and the resin at a region near the resin, and thereby the liquid crystal material near the resin exhibits a lower response to an applied electric field, compared with the liquid crystal material remote from the resin so that the dependency on the viewing angle is improved.

A liquid crystal device including cholesteric liquid crystal material and resin does not require a polarizer because it utilizes selective reflection of incident rays by the liquid crystal material. Also, formation of cells is not required. Therefore, the liquid crystal device can perform bright display on a large area. Since this liquid crystal device has a memory effect, memory elements such as TFT, MIM are not required.

According to the above method in which a small amount of resin is added to the liquid crystal material, however, a self-holding property or form-keeping property cannot be achieved sufficiently because the amount of the added resin is small. Therefore, a state of display is liable to change due to a pressure applied to the substrate surface.

Although this problem can be avoided by increasing an amount of the added resin, this causes other problems such as an increase of the required drive voltage and a lowering of the contrast.

Meanwhile, Japanese Laid-Open Patent Publication No. 6-301015 (301015/1994) has disclosed a liquid crystal device having a composite layer which includes resin partitions each formed between picture elements as well as liquid crystal regions formed between the partitions. This partition structure is formed in such a manner that a solution of a liquid crystal material and a raw material of resin is radiated with ultraviolet rays through a photomask so that a portion of the raw material of resin radiated with ultraviolet rays is cured to form a resin partition which corresponds to the photomask.

The liquid crystal device having the partition structure of resin can suppress flow of the liquid crystal material, and therefore has a high self-holding property. Further, the forms of the liquid crystal regions can be uniform and can be positioned accurately. Therefore, required drive voltages for the respective liquid crystal regions can be uniform so that it is possible to reduce the drive voltage required for operating simultaneously all the liquid crystal regions. Since each liquid crystal region has a relatively large size defined by the partition structure, the device can provide a better contrast than a liquid crystal device in which fine liquid crystal regions are dispersed in the resin portions. Such an advantage can also be achieved that sealing is not required at the periphery of the substrate.

Japanese Laid-Open Patent Publication No. 6-301015 has also disclosed that the resin partition structure can employ a network-form structure, in which a slight amount of liquid crystal material is finely dispersed in the resin, and can also employ a structure, in which the liquid crystal material is not contained in the resin and the network form is not formed. The above publication has also disclosed that the dependency on the viewing angle can be reduced by orientation processing using homogeneous orientation film or the like when using twisted nematic (TN) or super-twisted nematic (STN) liquid crystal.

In the liquid crystal device having the resin partition structure, the liquid crystal material which is dispersed finely within the resin tends to scatter the light and, thereby reducing the contrast even though the resin in the network form can reduce the dependency on the viewing angle in the planar orientation state of the liquid crystal material. If the resin wall does not have a network form, the contrast can be good, but the dependency on the viewing angle increases because the helical axes of cholesteric liquid crystal molecules in the planar orientation are oriented too uniformly. In this case, the dependency on the viewing angle can be reduced by disarranging the orientation of the helical axes of liquid crystal molecules with the orientation processing. However, if cholesteric liquid crystal material has a short helical pitch length, the orientation processing can exert only a small influence on the orientation of liquid crystal molecules, and therefore cannot sufficiently reduce the dependency on the viewing angle.

Accordingly, it is desired to control the form of the resin wall so that both the contrast and the dependency on the viewing angle may be improved. According to a polymerization phase separating method, the form and structure of the resin wall changes widely depending on the conditions of the phase separation and the kinds of resin and liquid crystal material. Furthermore, it cannot be controlled easily. The contrast of the liquid crystal device is affected in a complicated manner by the structure of the resin wall, as well as a consistency of reflectance between the liquid crystal material and the resin, a mechanism of phase separation and others. Accordingly, if the resin wall is formed in a desired form while other conditions are satisfied, the materials of the liquid crystal and resin which can be used are restricted to a narrow range. A resin wall may be formed in advance on one of the substrates by a screen printing method, ink jet or the like. However, finer picture elements and therefore high resolution display elements can be formed when the resin wall is formed by the polymerization phase separating method.

SUMMARY OF THE INVENTION

An object of the present invention is to provide a liquid crystal device having a pair of substrates and a composite layer held between the substrates, including a liquid crystal phase and a resin phase, and particularly a liquid crystal device which can achieve a high contrast and a small dependency on viewing angle.

Another object of the present invention is to provide a method of manufacturing a liquid crystal device having a pair of substrates and a composite layer held between the substrates, including a liquid crystal phase and a resin phase. Particularly, a method to allow easy manufacture of the liquid crystal device, which can achieve a high contrast and a small dependency on a viewing angle, by selecting a liquid crystal material of the liquid crystal phase and a resin material of the resin phase from wide ranges, respectively.

Still another object of the invention is to control a form of the resin phase in a liquid crystal device having a composite layer which includes a liquid crystal phase and a resin phase. Particularly, a method of controlling the form of the resin phase to provide a liquid crystal device that achieves high contrast and a small dependency on viewing angle.

For achieving the above objects, the inventors conducted research and obtained the following knowledge. In order to improve contrast and reduce dependency on viewing angle, it is desired that the resin phase does not internally contain liquid crystal material and is provided at its surface with minute projections. In the case where the resin phase is formed by the polymerization phase separating method, a larger contact angle between the liquid crystal material and the resin reduces an amount of liquid crystal material contained in the resin phase after phase separation. On the contrary, a smaller contact angle between the liquid crystal material and the resin increases the amount of liquid crystal material contained in the resin phase after the phase separation, which tends to provide the resin phase having a network form.

According to an aspect of the invention, there is provided a liquid crystal device comprising a pair of substrates; and a composite layer disposed between said substrates, said composite layer including a liquid crystal phase of a liquid crystal material and a resin phase of a resin, said resin phase not containing said liquid crystal material therein, said resin phase having a rough surface which is sufficient for disarranging an orientation of molecules of the liquid crystal material.

The foregoing expression "said resin phase not containing said liquid crystal material therein" represents such cases that the resin phase hardly contains the liquid crystal material, that the resin does not substantially contain the liquid crystal material, that the resin contains only an ignorable amount of liquid crystal material and that the amount of the contained liquid crystal material can be ignorable.

According to another aspect of the invention, there is provided a liquid crystal device comprising a pair of substrates; and a composite layer disposed between those substrates, the composite layer includes a liquid crystal phase of a liquid crystal material and a resin phase of a first resin and a second resin, wherein a contact angle of the first resin with respect to the liquid crystal material is different from that of the second resin with respect to the liquid crystal material.

According to still another aspect of the invention, there is provided a method for producing a liquid crystal device comprising the steps of (a) defining a mixing ratio of a first raw material for a first resin and a second raw material for a second resin, a contact angle of the first resin with respect to a liquid crystal material being different from that of the second resin with respect to the liquid crystal material; (b) mixing the first raw material with the second raw material at the ratio defined in the step (a), and thus providing a mixed raw material; (c) mixing the mixed raw material with the liquid crystal material; and (d) separating the mixed material from the liquid crystal material.

According to yet another aspect of the invention, the following is provided. In a liquid crystal device provided with a composite layer including a liquid crystal phase of a liquid crystal material and a resin phase of a resin, a method for controlling the formation of the resin phase comprising the steps of (a) selecting a raw material for a resin, a contact angle of the resin with respect to the liquid crystal material being in a range from 11° to 15°; (b) mixing the raw material with the liquid crystal material; and (c) separating the material from the liquid crystal material.

The foregoing and other objects, features, aspects and advantages of the present invention will become more apparent from the following detailed description when taken in conjunction with the accompanying drawings.

DESCRIPTION OF THE PREFERRED EMBODIMENTS

Figure 1A:
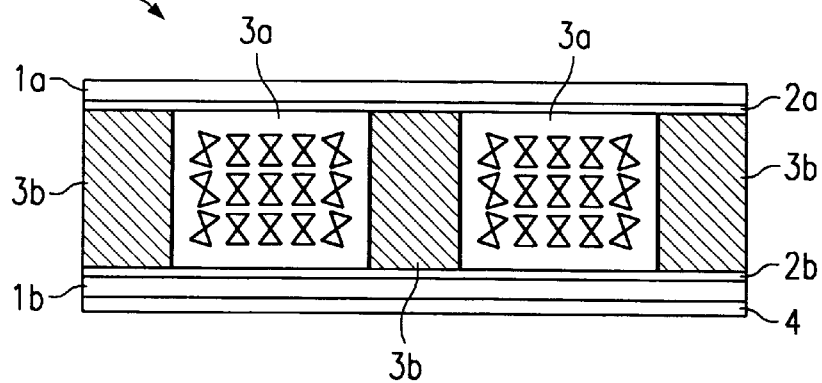
FIG. 1A schematically shows a cross section of a liquid crystal device of an embodiment of the invention.

In a liquid crystal device of a preferred embodiment of the present invention (i.e., a liquid crystal device of a first embodiment), a composite layer including a liquid crystal phase and a resin phase is held between a pair of substrates. The resin phase does not contain the liquid crystal material therein, and has a rough surface which is sufficient for disarranging an orientation of molecules of the liquid crystal material. Thus, the resin phase does not internally contain a liquid crystal material, and has a surface unevenness which can disturb the orientation of the liquid crystal material.

In a liquid crystal device of another preferred embodiment of the present invention (i.e., a liquid crystal device of a second embodiment), a composite layer including a liquid crystal phase and a resin phase is held between a pair of substrates. The resin phase includes two kinds of resin providing different contact angles with respect to the liquid crystal material, respectively.

In the liquid crystal devices of the first and second embodiments of the invention, the liquid crystal material may be a material which exhibits a cholesteric characteristic at a service environment temperature, and can perform display by utilizing a difference in quantity of reflected visible light between a planar state and a focal conic state of the liquid crystal material. In this structure, irregularities at the surface of the resin phase may be determined to disarrange the orientation of helical axes in the planar state of the liquid crystal material exhibiting the cholesteric characteristic.

The foregoing liquid crystal material exhibiting the cholesteric characteristic may be, for example, a cholesteric liquid crystal material or a chiral nematic liquid crystal material made of a nematic liquid crystal material and a chiral ingredient added thereto for providing a predetermined helical pitch length.

The nematic liquid crystal material may be a material containing, e.g., cyanobiphenyl, tolane or pyrimidine, and has a positive dielectric anisotropy. More specifically, MN1000XX (manufactured by Chisso Co., Ltd.) as well as ZLI-1565 and BL-009 (both manufactured by Merck Co., Ltd.) may be available. The chiral ingredient may be a compound having asymmetric carbon and capable of inducing an optical rotation in the liquid crystal molecules. More specifically, S-811, S-1011, CB15, CE2 (all manufactured by Merck Co., Ltd.) and others may be available. Cholesteric nonanoate (manufactured by Merck Co., Ltd.) of cholesteric liquid crystal material may be used as a chiral ingredient.

In the liquid crystal devices of the first and second embodiments of the invention, the resin phase may be a resin wall. This resin wall may take the form of columns extending between the paired substrates, a wall extending between the paired substrates and providing a continuous liquid crystal region, or a partition extending between the paired substrates and thus dispersing the liquid crystal material into a plurality of independent regions. The resin wall having the partition form may have such a structure as to provide one liquid crystal region at a position corresponding to a plurality of picture elements, or provide a plurality of liquid crystal regions corresponding to one picture element. As a typical example, the partition may be formed in a nondisplay region between the picture elements such that one liquid crystal region is formed at a position corresponding to each pixel element. In any one of the above cases, the resin phase has such a form as to provide a sufficient self-holding property in the composite layer, and effectively suppresses change in the display state which may be caused by an external pressure, even if the substrates holding the composite layer therebetween are made of a soft material.

The resin wall may be preferably made of a photo-curing (ultraviolet-curing) resin. The photo-curing resin can provide such an advantage that start and stop of polymerization of a resin raw material can be controlled easily.

In the liquid crystal devices of the first and second embodiments of the invention, the "substrates" holding the composite layer conceptually include flexible or less flexible plate-like members, flexible films and others. For example, one of the paired substrates may be a plate having a hardness which allows holding of the composite layer, and the other may be a member such as a film for protecting the composite layer. The material of the substrate may be glass, polyethylene terephthalate, polycarbonate, polyether sulfone or the like. For performing the display in a reflective manner, a transparent member is employed as at least one of the substrates.

In the liquid crystal device of the second embodiment, the resin phase includes one kind of resin providing a contact angle of 10° or less with respect to the liquid crystal material and one kind of resin providing a contact angle of 20° or more with respect to the liquid crystal material. A mixing ratio of these kinds of resin is determined such that the resin mixture provides a contact angle in a range from 11° to 15° as a whole. Thereby, it is possible to provide a resin phase which does not internally contain the liquid crystal material and has a surface roughness disarranging an orientation of liquid crystal molecules.

In the liquid crystal device of the first embodiment, the resin phase may be made of two kinds of resin and, particularly, two kinds of resin providing different contact angles with respect to the liquid crystal material. In this case, these kinds of resin may likewise be mixed at such a ratio that the mixed resin provides a contact angle from 11° to 15° with respect to the liquid crystal material as a whole. Naturally, in the liquid crystal device of the first embodiment, the resin phase may be made of one kind of resin, in which case the resin is desired to provide the contact angle from 11° to 15°.

In the liquid crystal devices of the first and second embodiments, the resin phase may be made of three or more kinds of resin providing different contact angles with respect to the liquid crystal material, respectively. In this case, the resin phase may include two or more kinds of resin providing the contact angle of 10° or less with respect to the liquid crystal material and/or two or more kinds of resin providing the contact angle of 20° or more with respect to the liquid crystal material. These kinds of resin are mixed at such a ratio that the mixture of all kinds of resin provides the contact angle from 11° to 15° with respect to the liquid crystal material.

According to the liquid crystal device of the first embodiment, the resin phase does not internally contain the liquid crystal material. Therefore, scattering of the light is suppressed so that a good contrast can be achieved. Since the resin phase has the surface roughness which can disarrange the orientation of the liquid crystal material, the orientation of helical axes of the liquid crystal molecules in the planar state is disarranged in the structure employing the liquid crystal material which exhibits the cholesteric characteristic, and therefore the dependency on the viewing angle can be reduced.

According to the liquid crystal device of the second embodiment, two kinds of resin are mixed to provide the resin phase having a form similar to that of the liquid crystal device of the first embodiment. Therefore, the liquid crystal device can provide a good contrast and a small dependency on the viewing angle, and the resin can be selected from a wide range.

The liquid crystal devices of the first and second embodiments can be manufactured from the following steps (a) to (d).

(a) defining a mixing ratio of a first raw material for a first resin and a second raw material for a second resin, a contact angle of said first resin with respect to a liquid crystal material being different from that of said second resin with respect to said liquid crystal material; (b) mixing the first raw material with the second raw material at the ratio defined in the step (a), and thus providing a mixed raw material; (c) mixing the mixed raw material with the liquid crystal material; and (d) separating the mixed material from the liquid crystal material.

More specifically, an assembly of a pair of transparent plates is formed with a spacer therebetween, and a space between the plates is filled with a liquid crystal mixture. The liquid crystal mixture is made of a liquid crystal material exhibiting a cholesteric characteristic at room temperature, monomers and/or oligomers, i.e., raw materials of two kinds of photo-curing resin providing different contact angles with respect to the liquid crystal material, and a polymerization initiator mixed at a predetermined ratio. Then, a photomask having a predetermined pattern is located outside the plate, and radiation is performed with rays (e.g., ultraviolet rays) having a predetermined intensity of illumination through the photomask at a temperature equal to or higher than a clearing point of the liquid crystal material exhibiting the cholesteric characteristic. Thereby, the resin monomers or oligomers are cured at a portion radiated with the rays so that phase separation occurs between the liquid crystal material and the resin, and the resin wall corresponding to the mask form is formed.

In the liquid crystal device having the composite layer which includes the liquid crystal phase and the resin phase, as employed in the first and second embodiments, the form of the resin phase can be controlled through the following steps (a) to (c):

(a) selecting a raw material for the resin, a contact angle of said resin with respect to the liquid crystal material being in a range from 11° to 15°; (b) mixing the raw material with the liquid crystal material; and (c) separating the material from the liquid crystal material.

More specifically, an assembly of a pair of transparent plates is formed with a spacer therebetween, and a space between the plates is filled with a liquid crystal mixture. The liquid crystal mixture is made of a liquid crystal material exhibiting a cholesteric characteristic at a room temperature, monomers and/or oligomers, i. e., raw material of photo-curing resin providing a contact angle from 11° to 15° with respect to the liquid crystal material, and a polymerization initiator mixed at a predetermined ratio. Then, a photomask having a predetermined pattern is located outside the plate, and radiation is performed with rays (e.g., ultraviolet rays) having a predetermined intensity of illumination through the photomask at a temperature equal to or higher than a clearing point of the liquid crystal material exhibiting the cholesteric characteristic. Thereby, the resin monomers or oligomers are cured at a portion radiated with the rays so that phase separation occurs between the liquid crystal material and the resin; and the resin wall corresponding to the mask form is formed.

Since the resin phase is made of the resin having the contact angle in the foregoing range, it is possible to determine the form of the resin phase which contains completely or nearly no liquid crystal material therein, and has a surface roughness which can disarrange the orientation of the liquid crystal molecules. In the structure using the liquid crystal material which exhibits the cholesteric characteristic at a service environment temperature, the roughness is determined such that the roughness can disarrange the directions of the helical axes in the planar orientation of the liquid crystal material.

In the foregoing control method, the resin may include one kind of resin providing a contact angle of 10° or less with respect to the liquid crystal material and one kind of resin providing a contact angle of 20° or more with respect to the liquid crystal material. If the whole resin mixture can provide the contact angle in a range from 11° to 15° with respect to the liquid crystal material, the mixture may include two or more kinds of resin providing the contact angle of 10° or less with respect to the liquid crystal material and/or two or more kinds of resin providing a contact angle of 20° or more.

In order to provide the contact angle from 11° to 15° with respect to the liquid crystal material while satisfying conditions such as a consistency between reflectance of the liquid crystal material and that of resin, an adhesiveness to the plate, and a thermal resistance, the resin may be selected only from a restricted range. However, by mixing two kinds of resin at an adjusted mixing ratio so that the contact angle of the whole mixture with respect to the liquid crystal material can be controlled, the range for selection of the resin can be increased.

The polymerization initiator may be a material which induces radical polymerization of resin when radiated with light (e.g., ultraviolet light). More specifically, the polymerization initiator may be, for example, DAROCUR 1173 or IRGACUR 184 (both manufactured by Ciba Geigy Co., Ltd).

The "contact angle between the resin and the liquid crystal material" represents an angle which is defined in such state that a droplet of the liquid crystal material is located on the solid resin surface in the air and, more specifically, an angle which contains the liquid crystal droplet and is defined between a solid resin surface and a tangent line on the liquid crystal droplet, which extends through a contact point among the three phases of the air, liquid crystal material and resin. The contact angle is determined by the liquid droplet method in which the measurement is performed with a liquid crystal droplet laid on a horizontal solid resin surface. The contact angle can be measured with a contact angle gauge. For example, the contact angle gauge may be a FACE contact angle gauge manufactured by Kyowa Kaimen Kagaku CO., Ltd. For avoiding an error in measurement, an angle containing a central side of the liquid crystal droplet may be selected, as the measured value, from the angles defined between the resin surface and a straight line extending from the contact point among the three phases of the air, liquid crystal material and resin to the top point of the liquid crystal droplet, and a value equal to double the measured value may be employed as the value of the required contact angle.

FIG. 1A schematically shows an example of a cross section of the liquid crystal device according to the first embodiment of the invention thus produced. By appropriately selecting the resin of the resin phase, the liquid crystal device of the second embodiment of the invention can have the structure shown in FIG. 1A.

The liquid crystal device includes transparent substrates or plates $1a$ and $1b$ provided at their inner sides with transparent and electrically conductive films $2a$ and $2b$, respectively, and a composite layer 3 held between the substrates $1a$ and $1b$. The composite layer 3 is made of a liquid crystal phase $3a$ of cholesteric liquid crystal material and a resin phase $3b$. In this embodiment, the resin phase $3b$ has a partition structure. The resin phase $3b$ does not internally contain a liquid crystal region, and has fine irregularities at the surface in contact with the liquid crystal material. Therefore, liquid crystal molecules in contact with the resin phase $3b$ are disarranged. A black light absorbing layer 4 is arranged as a background layer outside the transparent substrate $1b$. For driving this liquid crystal device, a pulse power source (not shown) or the like is connected between the transparent conductive films 2a and 2b.

Figure 1B:
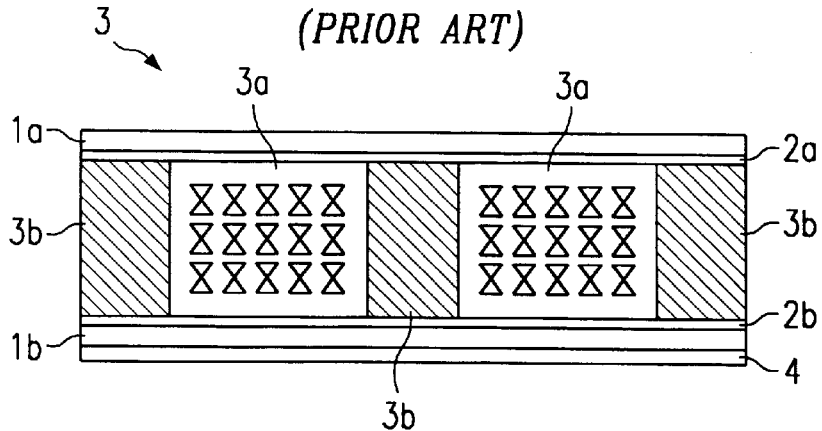
FIGS. 1B and 1C schematically show cross sections of an example of a liquid crystal device having a composite layer including a liquid crystal phase and a resin phase in the prior art.
Figure 1C:
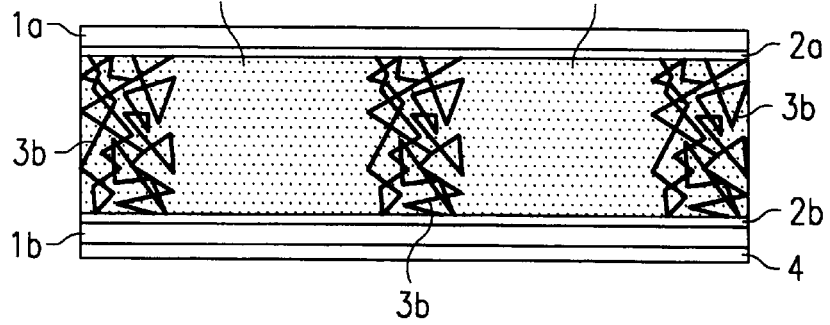

If the contact angle of the resin forming the resin phase and the liquid crystal material is relatively large, the resin phase does not internally contain a liquid crystal region and is isotropic, and the surface thereof in contact with the liquid crystal material has a smooth structure, as shown in FIG. 1(B). In this case, scattering of incident rays is suppressed so that the contrast is high. In the planar orientation state of the cholesteric liquid crystal material, however, helical axes are oriented to uniformly so that display is strongly affected by the viewing angle. If the contact angle of the resin forming the resin phase with respect to the liquid crystal material is relatively small as a whole, the resin phase takes the form of a network and liquid crystal regions are dispersed therein, as shown in FIG. 1(C). In this case, a required drive voltage for the liquid crystal material dispersed in the resin phase is much higher than that for the liquid crystal material remote from the resin phase, and the orientation of the liquid crystal material dispersed in the resin phase occasionally does not change if the voltage applied for driving is low. Therefore, the required drive voltage is high as a whole. Since the incident rays are scattered by the liquid crystal material within the resin phase, or is scattered on the interface between the liquid crystal material and the resin, the contrast lowers. In particular, display of black is liable to be unclear.

However, according to the liquid crystal device of the first embodiment of the invention shown in FIG. 1(A), the resin phase contains completely or nearly no liquid crystal material therein, and is provided at its surface with irregularities. Therefore, the incident rays are not scattered or are hardly scattered. When the liquid crystal material exhibiting the cholesteric characteristic is in the planar orientation, the helical axes are disarranged to an appropriate extent so that the dependency on the viewing angle decreases.

According to the liquid crystal device of the first embodiment of the invention shown in FIG. 1A, since the resin phase has the resin partition structure extending between the paired substrates, flow of the liquid crystal material is suppressed so that a high self-holding property is achieved, and change in display which may be caused by an external pressure can be suppressed even if the substrates are soft. Since the resin phase does not internally contain the liquid crystal material, the required drive voltage can be lower than that of the liquid crystal material in FIG. 1(C).

The liquid crystal devices of the first and second embodiments can be driven, e.g., by application of voltage. Application of voltage to the composite layer may be performed, for example, in such a manner that electrically conductive films are provided on (usually, inside) the paired substrates and the voltage is applied across the conductive films, or the liquid crystal device is inserted between a pair of externally arranged electrodes and a voltage is applied across the external electrodes, or a voltage is applied across a conductive film arranged on one of the substrates and an electrode (e.g., a pen electrode or an eraser electrode) arranged outside the other substrate. If the conductive film is to be arranged on the transparent substrate, a transparent conductive film such as an ITO film may be arranged thereon.

In the case where the liquid crystal device using the liquid crystal material exhibiting the cholesteric characteristic is to be driven by application of the voltage, two kinds of voltage, i.e., high and low pulse voltages, are applied to switch the orientation state of the liquid crystal molecules between the planar orientation state and the focal conic orientation state.

The liquid crystal material exhibiting the cholesteric characteristic selectively reflects the rays having a wavelength corresponding to a product of the helical pitch length and the average reflectance of the liquid crystal material when it is in the planar orientation wherein the helical axes are oriented perpendicularly to the substrate. Therefore, by employing the liquid crystal materials of which selective reflection wavelengths are in a red range, blue range and green range, respectively, the liquid crystal materials in the planar orientation selectively reflect the ranges of the respective wavelengths to perform display in red, blue and green. By setting the selective reflection wavelength in a range such as an infrared range outside the visible range, the liquid crystal material in the planar orientation exhibits a transparent appearance. In the structure employing a chiral nematic liquid crystal material, the helical pitch length can be controlled by controlling an amount of added chiral ingredient, whereby the selective reflection wavelength can be controlled.

The liquid crystal material exhibiting the cholesteric characteristic exhibits an opaque appearance by scattering the incident rays when it is in the focal conic state and thus its helical axes are oriented irregularly. If the liquid crystal material exhibiting the cholesteric characteristic has a short helical pitch length and therefore has the selective reflection wavelength, for example, in a visible range, the helical axes are oriented substantially parallel to the substrate when it is in the focal conic state so that a nearly transparent appearance can be exhibited.

By switching the state between the planar state and the focal conic state, therefore, it is possible to perform the display between a colored state (planar state) and a transparent state (focal conic state), display between a transparent state (planar state) and an opaque state (focal conic state) and others. These states are held even after application of the voltage has ceased. The paired substrates may be transparent, and a background layer of an appropriate color may be arranged outside the substrate remote from the viewing side. Thereby, various displays such as a display between a colored appearance (planar state) and a background color (focal conic state) can be performed.

PRACTICAL EXAMPLES

The invention will now be described with reference to practical examples, but the invention is not restricted to the practical examples.

The nematic liquid crystal material MN1000XX was mixed at a weight ratio of 2:1 with the chiral ingredient made of a mixture of Cholesteric nonanoate CN and S811 (two kinds were employed for temperature compensation) so that a liquid crystal material A was prepared. The prepared liquid crystal material exhibiting cholesteric characteristic was controlled to have the selective reflection wavelength of 560 nm. This liquid crystal material A was mixed at a weight ratio of 8:2 with various kinds of photo-curing resin, and a resin wall was formed by performing photo-polymerization phase separation by exposure through a mask. The structure of the resin wall thus prepared was observed with a scanning electron microscope (SEM). The following table 1 shows the kinds of resin, the contact angles of the resins with respect to the liquid crystal material A, and the structures of the resin partitions thus prepared. The partition structure in FIG. 1(A) is indicated by "A", the partition structure in FIG. 1(B) is indicated by "B" and the partition structure in FIG. 1(C) is indicated by "C".

TABLE 1

| Resin | Contact angle (deg) | Resin wall structure |
|---|---|---|
| R128H | 13.4 | A |
| R712(2) | 13.00 | A |
| R551(2) | 12.74 | A |
| tert-BEA* | 23.02 | B |
| 2,4-DEA* | 9.80 | C |
| OPP1S | 7.70 | C |
| AM* | 6.32 | C |
| R564 | 9.74 | C |
| HDDA(2) | 7.10 | C |
| R684(2) | 7.54 | C | tert-BEA*: tert-butylphenol epoxy acrylate
2,4-DEA*: 2,4-dibromophenol epoxy acrylate
AM*: adamantil methacrylate From the table 1, it can be understood that an excessively large contact angle between the resin and the liquid crystal material provides the resin structure B which does not internally contain the liquid crystal material and has a smooth surface. An excessively small contact angle provide the resin structure C taking the form of network.

Further, the photo-curing resin was made of a mixture of tert-butylphenol epoxy acrylate (resin A) exhibiting a large contact angle and R684(2) (resin B) exhibiting a small contact angle. Mixtures were prepared in this manner but at various mixing ratios, and the influence of the mixing ratio on the resin structure was determined. The following table 2 shows the resin mixing ratios, contact angles of the whole resin mixtures with respect to the liquid crystal material A and the structures of the resin walls.

TABLE 2

| Resin A (%) | Resin B (%) | Contact angle (deg) | Resin wall structure |
|---|---|---|---|
| 100 | 0 | 23.0 | B |
| 90 | 10 | 19.5 | B |
| 80 | 20 | 17.2 | B |
| 60 | 40 | 14.2 | A |
| 40 | 60 | 11.3 | A |
| 20 | 80 | 9.3 | C |
| 0 | 100 | 7.5 | C |

From the table 2, the following can be understood. A plurality of kinds of resin exhibiting different contact angles with respect to the liquid crystal material may be employed in a mixed form, and the mixing ratio of them may be controlled, whereby the resin can be selected from a wide range and thereby the structure of the resin wall can be easily controlled. It can also be understood that the contact angle of the whole resin mixture with respect to the liquid crystal material is preferably in a range from about 11° to about 15°.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal device comprising:
   a first substrate and a second substrate; and
   a composite layer disposed between said first substrate and said second substrate, said composite layer including a liquid crystal phase of a liquid crystal material and a resin phase of a resin, said resin phase comprising a resin wall structure, said liquid crystal material being in contact with both of said first and second substrates, said resin phase having a rough surface which is sufficient to disarrange an orientation of molecules of said liquid crystal material.

2. A liquid crystal device according to claim 1, wherein the liquid crystal material exhibits a cholesteric characteristic.

3. A liquid crystal device according to claim 2, wherein the molecules of the liquid crystal material in a planar state are disarranged by the rough surface of said resin phase.

4. A liquid crystal device according to claim 1, wherein said resin phase comprises a plurality of pillars extending from one of said substrates to the remaining one of said substrates.

5. A liquid crystal device according to claim 1, wherein said resin is a mixture of a first resin material and a second resin material.

6. A liquid crystal device according to claim 5, wherein a contact angle of said first resin with respect to the liquid crystal material is different from a contact angle of said second resin with respect to the liquid crystal material.

7. A liquid crystal device according to claim 5, wherein the contact angle of said first resin with respect to said liquid crystal material is 10° or less, and the contact angle of said second resin with respect to said liquid crystal material is 20° or more.

8. A liquid crystal device according to claim 5, wherein a contact angle of said mixture of said first resin and said second resin with respect to the liquid crystal material is in a range from 11° to 15°.

9. A liquid crystal device according to claim 1, wherein a contact angle of said resin with respect to the liquid crystal material is in a range from 11° to 15°.

10. A liquid crystal device comprising:
    a pair of substrates; and
    a composite layer disposed between said substrates, said composite layer including a liquid crystal phase of a liquid crystal material and a resin phase of a mixture of a first resin and a second resin, wherein a contact angle of said first resin with respect to said liquid crystal material is different than a contact angle of said second resin with respect to said liquid crystal material, and a contact angle of said resin phase with respect to said liquid crystal material is in a range from 11° to 15°.

11. A liquid crystal device according to claim 10, wherein the contact angle of said first resin with respect to said liquid crystal material is 10° or less, and the contact angle of said second resin with respect to said liquid crystal material is 20° or more.

12. A liquid crystal device according to claim 10, wherein said liquid crystal material exhibits a cholesteric characteristic.

13. A liquid crystal device according to claim 10, wherein the contact angle of said first resin with respect to said liquid crystal material is 10° or less, the contact angle of said second resin with respect to said liquid crystal material is 20° or more, and said liquid crystal material exhibits a cholesteric characteristic.

14. A liquid crystal device according to claim 10, wherein a contact angle of a resin mixture of said first resin and said second resin with respect to the liquid crystal material is in a range from 11° to 15°, and said liquid crystal material exhibits a cholesteric characteristic.

15. A liquid crystal device according to claim 10, wherein said resin phase comprises a plurality of pillars extending from one of said substrates to the remaining one of said substrates.

16. A method for producing a liquid crystal device comprising the steps of:
(a) defining a mixing ratio of a first raw material of a first resin and a second raw material of a second resin wherein said first resin and said second resin are selected so as to be capable of forming a resin wall structure of a resin phase and
wherein a contact angle of said first resin with respect to said liquid crystal material is different than a contact angle of said second resin with respect to said liquid crystal material;
(b) mixing the first raw material with the second raw material at the ratio defined in step (a), and thus providing a mixed raw material;
(c) mixing the mixed raw material with the liquid crystal material;
(d) providing said mixed material between a pair of substrates; and
(e) separating the mixed material from the liquid crystal material so as to form a resin wall structure of a resin phase and a liquid crystal material of a liquid crystal phase, where said liquid crystal material is in contact with said substrates.

17. A method according to claim 16, wherein said first raw material contains at least one of first monomers and oligomers, and said second raw material contains at least one of second monomers and oligomers.

18. A method according to claim 17, wherein step (d) is executed by polymerization of the mixed raw material.

19. In the manufacturing of a liquid crystal device having a composite layer including a liquid crystal phase of a liquid crystal material and a resin phase of a resin, a method for controlling a form of said resin phase comprising the steps of:
(a) selecting a raw material to be used to form a resulting resin phase, a contact angle of said resulting resin phase with respect to the liquid crystal material being in a range from 11° to 15°;
(b) mixing the raw material with the liquid crystal material; and
(c) separating the raw material from the liquid crystal material.

20. A method according to claim 19, wherein said raw material contains a first raw material for a first resin and a second raw material for a second resin, wherein a contact angle of said first resin with respect to the liquid crystal material is different from a contact angle of said second resin with respect to the liquid crystal material.

21. A method according to claim 20, wherein the contact angle of said first resin with respect to the liquid crystal material is 10° or less, and the contact angle of said second resin with respect to the liquid crystal material is 20° or more.

22. A method according to claim 19, wherein the liquid crystal material exhibits a cholesteric characteristic.

23. A method according to claim 19, wherein the raw material contains at least one of monomers and oligomers.

24. A method according to claim 23, wherein step (c) is executed by polymerization of the raw material.

25. A liquid crystal device according to claim 1, wherein said liquid crystal phase comprises a nematic liquid crystal and a chiral material.

26. A liquid crystal device according to claim 25, wherein said nematic liquid crystal has a positive dielectric anisotropy.

27. A liquid crystal device according to claim 1, wherein said liquid crystal device has a memory effect.

28. A liquid crystal device comprising:
a first substrate and a second substrate; and
a composite layer disposed between said first substrate and said second substrate, said composite layer including a liquid crystal phase of a liquid crystal material and a resin phase of a first resin and a second resin, wherein a contact angle of said first resin with respect to said liquid crystal material is about 10° or less, and a contact angle of said second resin with respect to said liquid crystal material is about 20° or more.

29. A liquid crystal device in accordance with claim 28, wherein said liquid crystal material exhibits a cholesteric characteristic.

30. A liquid crystal device in accordance with claim 28, wherein a contact angle of said resin phase with respect to said liquid crystal material is in a range of 11° to 15°.

* * * * *